C. LAMPRE.
VEHICLE WHEEL.
APPLICATION FILED JUNE 18, 1912.

1,070,821.

Patented Aug. 19, 1913.

2 SHEETS—SHEET 1.

Witnesses
C. E. Jumper.
John J. McCarthy

Inventor
Celestin Lampre.
By Victor J. Evans
Attorney

C. LAMPRE.
VEHICLE WHEEL.
APPLICATION FILED JUNE 18, 1912.

1,070,821.

Patented Aug. 19, 1913.

2 SHEETS—SHEET 2.

Witnesses
C. E. Kemper
John J. McCarthy

Inventor
Celestin Lampre.

By Victor J. Evans
Attorney

UNITED STATES PATENT OFFICE.

CELESTIN LAMPRE, OF PITTSBURGH, PENNSYLVANIA.

VEHICLE-WHEEL.

1,070,821.  Specification of Letters Patent.  Patented Aug. 19, 1913.

Application filed June 18, 1912. Serial No. 704,369.

*To all whom it may concern:*

Be it known that I, CELESTIN LAMPRE, a citizen of the United States of America, residing at Pittsburgh, in the county of Allegheny and State of Pennsylvania, have invented new and useful Improvements in Vehicle-Wheels, of which the following is a specification.

This invention relates to improvements in vehicle wheels and has particular application to certain novel and useful improvements in cushion wheels. In carrying out the present invention, it is my purpose to provide a wheel of this type wherein the pneumatic tire or air tube will be proof against puncture and at the same time possess the necessary resilient qualities to facilitate the travel of the wheel without transmitting shock or jar to the running gear of the vehicle to which the wheel is attached. Furthermore, I aim to provide a wheel of this character which shall include a pneumatic tube disposed adjacent the rim of the wheel, and a solid tire bearing upon such tube and designed to form the wheel tread, whereby upon the solid tire meeting an obstruction in its path of travel, the transmission of a shock or jar to the vehicle body will be eliminated, owing to the pneumatic tube being interposed between the vehicle rim and the solid tire.

With the above and other objects in view which shall appear as the description progresses, the invention consists in the construction, combination and arrangement of parts hereinafter set forth in and falling within the scope of the appended claims.

Figure 1:
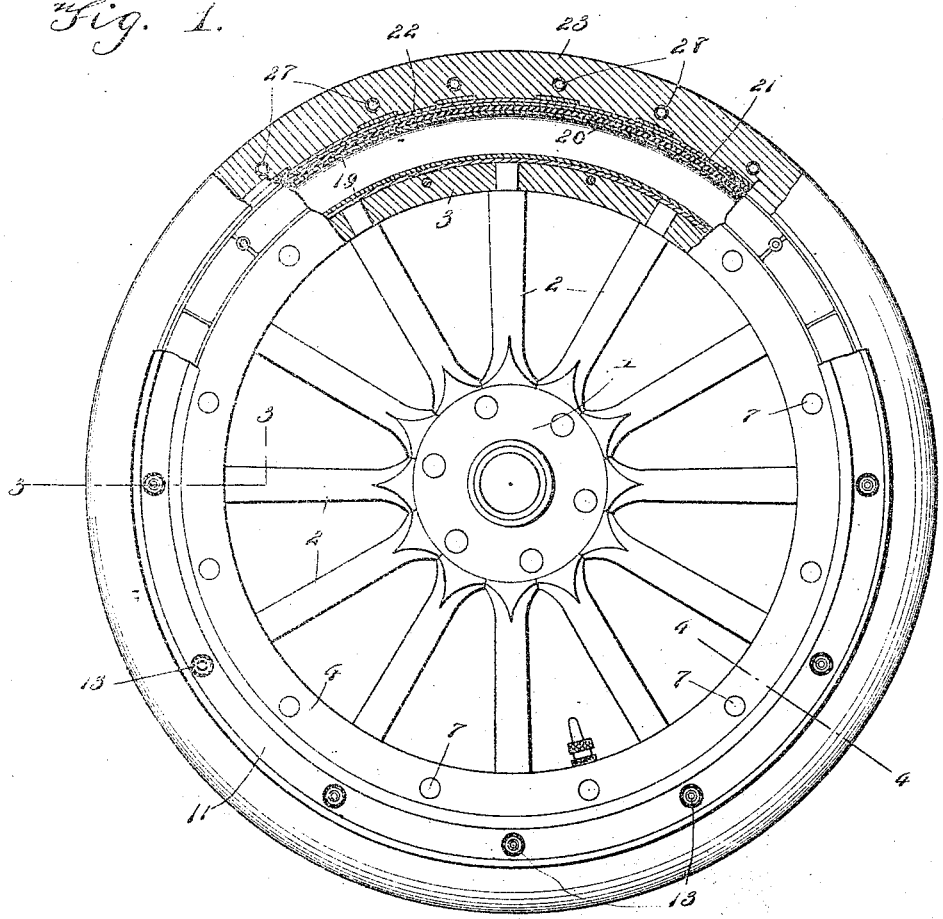
Figure 3:
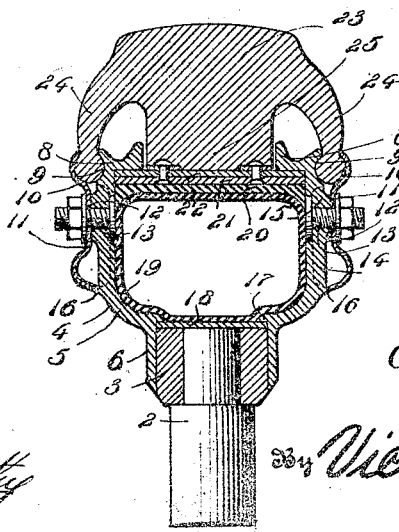
Figure 2:
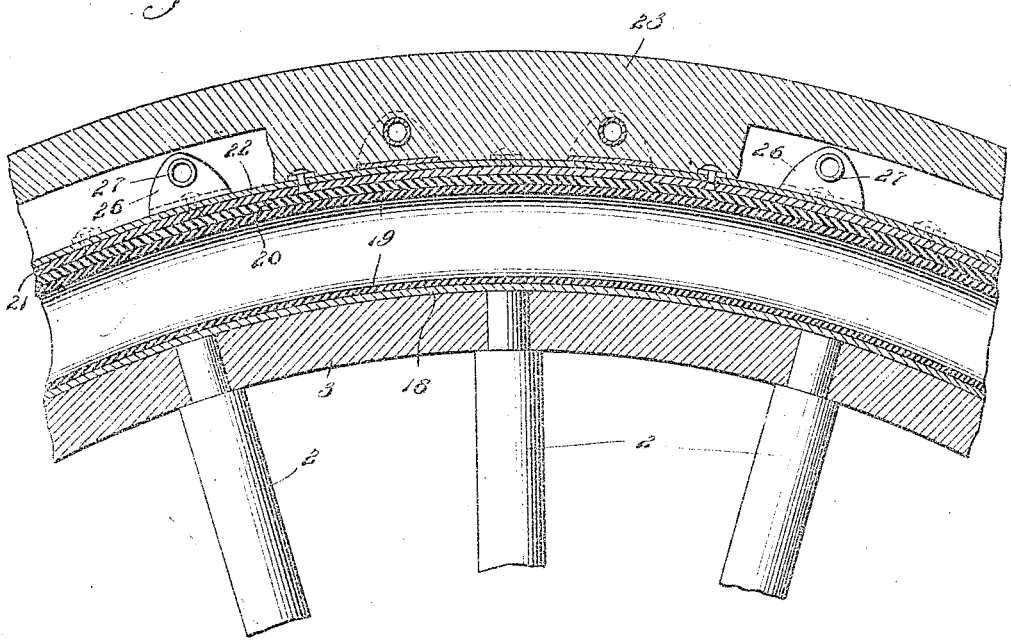
Figure 4:
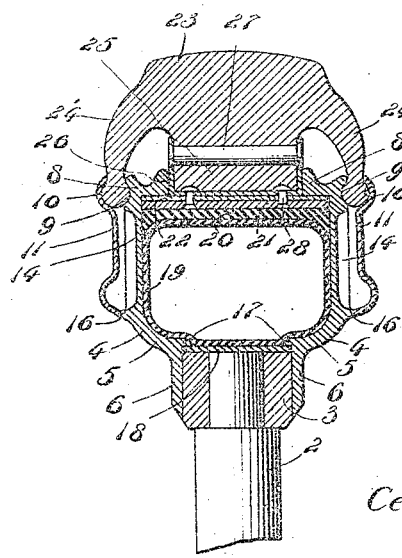

In the drawings forming a part of this specification and wherein has been illustrated what I now consider to be the preferred form of my invention: Figure 1 is a side elevation of a vehicle wheel constructed in accordance with the present invention, parts being broken away. Fig. 2 is an enlarged fragmentary sectional view of the same. Fig. 3 is a section on the line 3—3 of Fig. 1, and Fig. 4 is a similar view on the line 4—4 of Fig. 1.

Similar reference characters designate like parts throughout the several views.

Referring to the accompanying drawings in detail, the wheel as shown includes a hub 1 from which radiate the spokes 2, the latter being connected to the hub in any suitable or preferred manner. Suitably fastened to the free ends of the spokes is a rim 3 and bolted or otherwise secured to the opposite sides of the rim are what I term retainers 4. In the present instance, each retainer comprises a flange 5 provided with an offset portion 6 formed with suitable bolt-holes designed to receive bolts 7 to facilitate the application of the retainers to the wheel rim, and formed integral with each flange 5 of the retainers, is an inwardly projecting right angular lip 8, the flange at a point adjacent such lip being provided with a circumferentially extending groove 9 coöperating with a similar groove 10 formed in an annular clamping member 11. The clamping members 11 are adapted to snugly engage the upper surfaces of the flanges 5 and are provided at appropriate points with bolt openings 12 alining with similar openings in the flanges 5 and designed to receive headed bolts 13 adapted to threadedly engage the openings in the flanges whereby in the tightening of the bolts, said annular clamping members may be drawn into engagement with the flanges 5, the latter being offset laterally of the wheel incident to the formation of the members 6. Surrounding the bolt openings in the flanges 5 of the retainer and integral therewith are bosses 15 and ribs 14 designed to form a reinforce for the retainers. The flanges 5 of the retainers are rabbeted circumferentially at their lower longitudinal edges, as at 16 to receive the lower end of the clamp 11 so as to present, in effect, an integral structure. At the juncture of the offset portions 6 with each flange 5, the latter is provided with an inwardly extending annular lug 17 and interposed between the lugs 17 and the wheel rim, is a metallic band 18, the lugs serving to clamp the band against the rim.

Disposed intermediate the retainers 4 and resting upon the band 18, is a pneumatic tube 19 provided with a suitable inflating valve and adapted to contact with the inner walls of the flanges of the retainers. Surrounding the air tube 19 within the retainers is a band 20 preferably constructed of rubber, and inclosing this band is an annular band 21 constructed preferably of steel. A leather band 22 is arranged concentrically about the metal band 21 and is riveted or otherwise suitably fastened thereto. The bands 22, 21 and 20, and the air tube 19 are confined within the retainers and outward movement of such elements beyond the retainers, is eliminated owing to the lips 8 engaging the band 22 when the tube 19 has been inflated.

Fixed to the outer peripheral edges of the retainers 4 is a solid tire 23 preferably constructed of leather, although any other material suitable for the purpose may be utilized. This solid tire, in this instance, is provided with laterally projecting oppositely disposed wings 24 and the free ends of these wings are clamped to the retainers through the medium of the grooves 9 and 10 of the flanges 5 and clamps 11 respectively, and the bolts 13, as will be readily understood. Intermediate the wings 24 and projecting inwardly of the tire 23 and integral therewith, is a rib 25 adapted to enter the space between the lips 8 and coöperate with the air tube 19 to prevent the transmission of shocks or jars to the vehicle running gear in the movement of the wheel, when the latter meets an obstruction in the roadbed. In order to secure the rib 25 to the tire 23 within the intervening space between the lips 8 so that accidental displacement of the rib is prevented, I make use of a fastening device which in the present embodiment of the invention comprises a substantially U-shaped member 26 having its opposite limbs provided with alining apertures into which is interposed and firmly held a rivet tube 27, the latter being passed through an opening in the rib 25 previous to securing the ends of the said tube to the limbs of the U-shaped member. The connecting portion of the limbs of this U-shaped member is riveted as at 28, or otherwise suitably secured, to the metallic band 21 between the retainers, the rivets passing through the leather band 22 as shown. These U-shaped fastening devices 26 are arranged at appropriate distances apart around the circumference of the wheel in order to insure coöperative relation between the solid tire and the pneumatic tube at all times.

From the above description taken in connection with the accompanying drawing, it will be seen that I have provided a combined cushion and pneumatic tire whereby the transmission of shock to a vehicle body is eliminated owing to the coöperative engagement between the solid tire and the pneumatic tire, the pneumatic tire being rendered proof against puncture, and while I have herein shown and described one form of my invention, by way of illustration, I desire to have it understood that I do not limit myself to all of the details herein shown and described, as modification and variation may be made within the scope of the claim and without departing from the spirit or sacrificing any advantages of the invention.

I claim:

In a wheel, the combination with a hub, spokes and rim, of retainers fastened to the opposite sides of the rim, a pneumatic tube interposed between said retainers, a plurality of metallic and non-metallic bands surrounding the tube within said retainers, fastening devices secured to said bands and spaced appropriate distances apart and each comprising a U-shaped member having the opposite limbs thereof provided with alining apertures, and a rivet tube carried by said member and disposed within the apertures in the limbs thereof, and a solid tire connected to said retainers and fastening devices bearing indirectly upon said pneumatic tube.

In testimony whereof I affix my signature in presence of two witnesses.

CELESTIN LAMPRE.

Witnesses:
SAMUEL B. MILLERSON,
WILLIAM R. JOHNSTON.